UNITED STATES PATENT OFFICE.

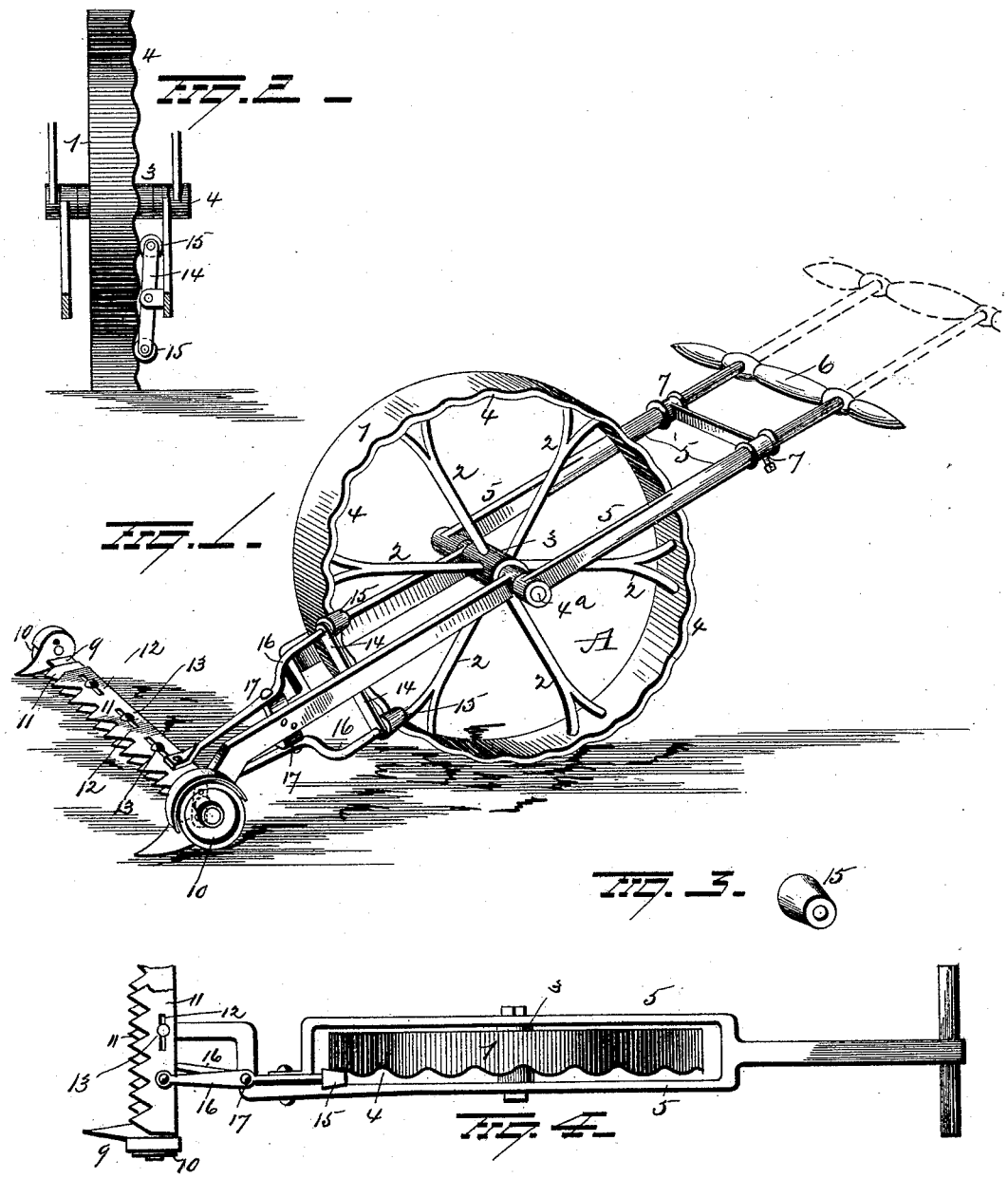

JACOB PHILLIPS, OF WESTFIELD, PENNSYLVANIA.

MOWING-MACHINE.

SPECIFICATION forming part of Letters Patent No. 421,430, dated February 18, 1890.

Application filed August 6, 1889. Serial No. 319,897. (No model.)

*To all whom it may concern:*

Be it known that I, JACOB PHILLIPS, of Westfield, in the county of Tioga and State of Pennsylvania, have invented certain new and useful Improvements in Mowing-Machines; and I do hereby declare the following to be a full, clear, and exact description of the invention, such as will enable others skilled in the art to which it appertains to make and use the same.

My invention relates to an improvement in lawn-mowers, the object being to provide a light and easy-running machine, in which the parts of the machinery are greatly reduced and are easily kept in repair and running order.

With these ends in view my invention consists in a reciprocating knife-bar in connection with a main wheel having cam-surfaces and means of imparting motion to the knife-bar through its contact with the cam-surface.

It further consists in certain novel features of construction and combinations of parts, as will be hereinafter fully described, and pointed out in the claims.

In the accompanying drawings, Figure 1 is a view in perspective of my improved machine. Fig. 2 is a detached view of a portion of the machine. Fig. 3 is a detached view of one of the taper-pinions, and Fig. 4 is a plan view of a modified form of machine.

A represents the main or ground wheel, upon which the entire machine is carried, and upon which it is dependent for its operation. This wheel is made open and as light as possible, having a broad tire 1 to give bearing-surface, and spokes 2 2, extending into the hub 3. One or both edges 4 of the tire are irregular in shape, or, in other words, scalloped or zigzag, as shown, to constitute a cam or cams, the function of which will be explained hereinafter.

It may be said right in this connection that the wheel has but one cam-edge for lawnmower purposes; but when the machine is geared for heavier work—such as field work— more power is required, and hence both edges have cams, and other slight changes are required, which hardly need mentioning.

The axle 4ᵃ extends loosely through the hub, and on its ends the frame, consisting of the side bars 5 5, is supported. A handle 6 is adjustably connected with the side bars by means of sleeves 7 7, in which the side bars are telescoped, which admits of the handle being lengthened or shortened to accommodate a tall or short person, or to do cutting at different distances—as, for example, on a long terrace, or at other places where with a short handle it is otherwise impossible to reach.

The side bars preferably join each other a short distance in front of the main wheel A, and to the forward end of the frame the finger-bar 9 is rigidly secured. This bar extends at right angles to the frame of the machine, and is of different lengths to suit the size of machine. On its ends it is furnished with the usual shoes or wheels 10 10, and means—such as perforations, as shown in Fig. 1—may be provided for elevating or lowering the wheels 10, whereby the bar is raised or lowered to cut the grass long or short.

One or two—generally two—knife-bars 11 11 are mounted on the finger-bar. Said bars 11 11 are provided with elongated slots 12 12, which are in juxtaposition when the knives register. Bolts or pins 13 13, having enlarged flattened heads thereon, extend through the slots and into the cutter-bar as a means for guiding the knife-bars in their opposite reciprocations.

A vibrating yoke 14 is pivotally supported at its center to one of the side bars of the frame, and at each end has a taper-wheel 15 loosely mounted, which bear on the cam-edge of the main wheel A, they being such distance apart that one is always in the inside of the scallop while the other is outside, thereby giving a vibratory motion to the yoke. This motion is communicated to the knife-bars, being in them an oppositely-reciprocating motion, through the instrumentality of a pair of levers 16 16, fulcrumed at point 17 on the frame and having loose connection at either end with the upper and lower knife-bars and the vibrating yoke.

In the modification shown in Fig. 4 the handle is not extensible, as in the main construction, and the frame is slightly different, joining the finger-bar nearer the center to give increased support. The knife-bars may be removed and sharpened on a grindstone after the usual manner of putting an edge on mowing-machine knives, and in the mowing-machine size the regular knives may be used.

The advantages of this variety of machine are numerous, but I need only refer to one or two. It may be made to cut the grass at most any height, whereas with the use of ordinary revolving knives tall grass and weeds remain uncut and cause much trouble. Still another advantage lies in the convenience in sharpening the knives and in otherwise manipulating or moving the machine.

It is evident that slight changes might be resorted to in the form and arrangement of the several parts described without departing from the spirit and scope of my invention, and hence I do not wish to limit myself to the particular construction herein set forth; but, Having fully described my invention, what I claim as new, and desire to secure by Letters Patent, is—

1. The combination, with a frame, a main wheel having a cam-edge and reciprocating knife-bars, of a yoke pivoted to the frame and carrying wheels which bear against said cam-edge and levers pivoted to the frame, the said levers being connected directly to the opposite ends of the yoke and to the cutters, substantially as set forth.

2. The combination, with a main cam-wheel, frame, and a finger-bar secured to the front end of the frame, of a pair of knife-bars mounted on the finger-bar, a vibrating yoke pivoted on the frame, taper-wheels on its ends, adapted to engage the cam-edge of the main wheel, and levers fulcrumed on the frame and connected directly with the knife-bars and yoke, substantially as set forth.

3. The combination, with a main cam-wheel, a frame, a finger-bar secured to the forward end of the frame, and shoes or wheels on which the finger-bar is supported at its ends, of a pair of knife-bars having elongated slots therein, bolts for holding the knife-bars on the finger-bar, a movable yoke pivoted on the frame, taper-wheels on its ends, adapted to engage the cam-edge of the main wheel, and levers fulcrumed on the frame and connected directly with the knife-bars and yoke, substantially as set forth.

4. The combination, with a ground-wheel having a cam-edge, an axle, a frame mounted on the axle, a cutter secured to the forward end of the frame, a vibrating yoke actuated by the cam-edge of the ground-wheel, and levers connected with the yoke and attached to the cutters, of a handle mounted on the axle, the said handle and frame being loosely connected so as to enable them to be moved independently of each other, substantially as set forth.

In testimony whereof I have signed this specification in the presence of two subscribing witnesses.

JACOB PHILLIPS.

Witnesses:
E. S. HORTON,
W. I. WASHBURN.